United States Patent [19]

Sominin et al.

[11] Patent Number: 4,545,008
[45] Date of Patent: Oct. 1, 1985

[54] METHOD AND AUTOMATIC CONTROL APPARATUS FOR CONTROLLING A TECHNOLOGICAL PROCESS

[76] Inventors: Mikhail A. Sominin, ulitsa Michurinskaya, 1, kv. 176; Valery N. Surikov, Belgradskaya ulitsa, 24, kv. 130; Jury A. Belokopytov, prospekt Kima, 7/19, kv. 67, all of Leningrad; Evgeny P. Fesenko, ulitsa Stroitelei, 5, korpus 1, kv. 38, Moscow, all of U.S.S.R.

[21] Appl. No.: 453,885
[22] PCT Filed: Apr. 20, 1981
[86] PCT No.: PCT/SU81/00039
§ 371 Date: Dec. 14, 1982
§ 102(e) Date: Dec. 14, 1982
[87] PCT Pub. No.: WO82/03703
PCT Pub. Date: Oct. 28, 1982
[51] Int. Cl.[4] .................. G05B 13/00; G05B 13/02
[52] U.S. Cl. ..................... 364/148; 364/155; 364/157
[58] Field of Search ............. 364/148, 152, 153, 154, 364/155, 157, 178; 318/636, 611

[56] References Cited

U.S. PATENT DOCUMENTS 3,221,230 11/1965 Osburn ..................... 364/152 X
4,257,093 3/1981 Peirson et al. ................ 364/155
4,306,284 12/1981 Malcolm ..................... 364/148

Primary Examiner—Joseph Ruggiero
Assistant Examiner—Allen MacDonald

[57] ABSTRACT

The method involves varying a parameter of an automatic controller to achieve optimal control quality and is operated in such manner that if the parameter of the controller changes in a direction of decrease in the stability margin of the control system, while the index of control quality is changing in a direction of increase in control quality, the parameter of the controller will be abruptly changed a number of times from a value corresponding to the stable state of the control system to a value corresponding to an unstable state thereof and back to the stable state until the index of control quality attains an optimal value corresponding to the best control quality. The automatic control apparatus comprises a storage device connected to the output of a device which generates a signal corresponding to the index of control quality, a control device for controlling the parameter of the automatic controller according to a signal generated by a direction signal generating circuit which responds to the direction of variation of the index of control quality. The apparatus includes a comparison circuit which changes the mode of operation of the device for controlling the parameter of the controller if the instant value of the index of control quality significantly deviates from the stored value corresponding to the best control quality.

7 Claims, 6 Drawing Figures

METHOD AND AUTOMATIC CONTROL APPARATUS FOR CONTROLLING A TECHNOLOGICAL PROCESS

FIELD OF THE INVENTION

The present invention relates to methods and apparatuses used for conducting technological processes and, more particularly, to methods and automatic control apparatuses for controlling a technological process.

The present invention can be used in automatic control systems for controlling output parameters of processes under varying conditions. The present invention can most advantageously be used in automatic control systems for controlling chemical, paper making, food and food refining as well as metallurgical processes.

BACKGROUND OF THE INVENTION

One of the objects to be achieved in controlling technological processes is to maintain an output parameter of the process at a desired level, which is usually accomplished by the use of an automatic controller. The parameters of the controller are chosen so as to provide the best control quality. Since, the conditions under which the controlled process is conducted and the process characteristics vary in the course of operation of the controller, the initially chosen parameters of the controller may cease to be optimal, from the standpoint of optimal control quality. For example, if the temperature in a chemical reactor is to be automatically controlled, variations in the chemical composition or quantity of the starting materials will affect the rate of chemical reaction and other characteristics of the controlled process thus necessitating readjustment of the controller in order to achieve the best control quality.

Known in the art is a method of controlling a technological process by maintaining an output parameter of the process at a desired level with the aid of an automatic controller, comprising the steps of measuring an index of control quality and varying the parameters of the controller so as to achieve the best control quality (cf. a book "Avtomatizatsiya proizvodstva i promyshlennaya elektronika", vol. 3, edited by A. I. Berg and V. A. Trapeznikov, published by "Sovetskaya Entsiklopediya", Moscow, 1962, p. 297). According to this method, the best control quality is achieved by varying the parameter of the controller which affects the index of control quality so that the latter represents an optimal function of the controller parameter. This parameter is varied in a direction causing the index of control quality to vary towards improvement of the control quality until an optimal value of the index corresponding to the best control quality is reached. If the variation of the controller parameter leads to a decline in control quality, the direction of variation of the controller parameter is reversed. Such variation of the controller parameter makes it possible to achieve better control quality when controlling a process under varying conditions and thus ensures a higher accuracy of control of the output parameter of the process.

Variation of the controller parameter at least in one direction usually leads to reduction in the stability margin of the automatic control system. Therefore, the variation of this parameter should be carried out so as not to cause the system to become unstable.

The known method can be carried out by the use of a known automatic control apparatus comprising an automatic controller for maintaining an output parameter of a technological process at a desired level, a control quality signal generating device for generating a signal representative of an index of control quality, a control signal generating circuit for generating a control signal depending on variation of the signal representative of the index of control quality, and a parameter adjusting device connected to the output of the control signal generating circuit for adjusting a parameter of the automatic controller (cf. the above-cited reference, p. 296, FIG. 6).

Greater time is required for adjustment of the controller parameter to a value which ensures the best control quality, the greater the deviation of the index of control quality from an optimum value and the longer the time lag of the controlled equipment. Therefore, in the event of a large deviation of the index of control quality from its optimum value in control systems, wherein the controlled equipment has a considerable time lag (e.g. several minutes), the adjustment of the controller parameter will be rather slow, which will lead to substantial reduction in the control accuracy when the process is conducted under varying conditions.

SUMMARY OF THE INVENTION

The principal object of the present invention is to provide a method and automatic control apparatus for controlling a technological process, which enables more rapid adjustment of a parameter of the controller to its optimum value for variations in the process characteristics even when the controlled equipment has a considerable time lag, thereby to increase the control accuracy of the controller.

With this principal object in view, there is proposed a method of controlling a technological process by maintaining an output parameter of the process at a desired level with the aid of an automatic controller, comprising the steps of measuring an index of control quality and gradually varying a parameter of the automatic controller. Variation of the parameter of the controller in one direction leads to reduction in the stability margin of the automatic control system and also affects the measured index of control quality so that the latter represents an extremal function of said parameter of the controller. The variation of the parameter of the controller is carried out in such a way that if the index of control quality varies in a direction corresponding to improvement in the control quality, the direction of variation of the parameter remains unchanged. If the index of control quality varies in a direction corresponding to decline in the control quality, the direction of variation of the parameter is reversed. According to the invention, when the direction of variation of the index of control quality changes towards decline in the control quality, the value of the index of control quality is stored, and the parameter of the controller is varied with regard to the deviation of the index of control quality from the stored value. If the deviation of the index of control quality from the stored value exceeds a preselected value and the parameter of the controller varies in the direction of reduction in the stability margin of the automatic control system, while the index of control quality varies in the direction corresponding to improvement in the control quality, then, when the parameter of the controller achieves a predetermined value, corresponding to the stable state of the automatic control system, this parameter is abruptly changed to a value corresponding to the unstable state of the automatic control system. After a time period, smaller than that during which the automatic control system may lose stability. This parameter is again abruptly changed but this time to a value corresponding to a greater stability margin of the automatic control system than said parameter predetermined value. After this the parameter of the controller is gradually varied in the direction of reduction in the stability margin of the automatic control system until this parameter again achieves said predetermined value or until the direction of variation of the index of control quality is reversed. When the direction of variation of the index of control quality changes towards decline in the control quality after its deviation from the stored value has exceeded said preselected value, a new value of the index of control quality is stored, whereupon the parameter of the controller is varied and the index of control quality is stored with regard to the new stored value in the manner outlined above.

This method, by increasing the range of variation of the controller parameter in the direction corresponding to decline in the stability margin of the automatic control system, makes it possible to increase the action of the controller on the controlled equipment in the event of a great deviation of the index of control quality from its optimum value in a direction which required variation of the controller parameter towards reduction in the stability margin of the automatic control system. This provides a more rapid adjustment of the controller parameter upon variation of the process characteristics when the controlled equipment has a considerable time lag. As a result, the control accuracy provided by the controller is increased.

It is expedient to use the variance of the deviation of the output parameter of the process from the desired level as the measured index of control quality and the gain of the controller as the varied parameter of the controller.

With the aforementioned principal object in view, there is also proposed an automatic control apparatus comprising an automatic controller for maintaining an output parameter of a technological process at a desired level. The apparatus includes a control quality signal generating device for generating a signal representative of an index of control quality, a control signal generating circuit for generating a control signal depending on variation of the signal representative of the index of control quality, and a parameter adjusting device connected to the output of the control signal generating circuit for adjusting a parameter of the automatic controller. According to the invention, the apparatus includes a controlled storage device having its data input connected to the output of the control quality signal generating device, a direction signal generating circuit having its input connected to the output of the control quality signal generating device for generating a signal indicative of the direction of variation of the index of control quality and its output connected to the input of the control signal generating circuit for changing the signal at the output of the control signal generating circuit after the direction of variation of the index of control quality changes towards decline in the control quality. A comparison circuit of the apparatus has its one input connected to the output of the controlled storage device and its other input connected to the output of the control quality signal generating device. A control circuit has its inputs connected to the output of the direction signal generating circuit and to the output of the comparison circuit for generating a binary signal having a first value when the magnitude of the difference between the current value of the index of control quality and its value stored in the controlled storage device exceeds a preselected value and for generating a binary signal having a second value after the direction of variation of the index of control quality changes towards decline in the control quality if the magnitude of the difference between the current value of the index of control and its value stored in the controlled storage device is smaller than said preselected value. The output of the control circuit is connected to the control input of the controlled storage device for storing the controlled storage device with the value of the index of control quality occuring just before the signal at the output of the control circuit assumes the second value. The parameter adjusting device is connected to the output of the control circuit for abruptly changing the parameter of the controller, when this parameter attains a predetermined value and the signal at the output of the control circuit has the first value, to a limit value beyond the range of variation of this parameter during the time period when the signal at the output of the control circuit has the second value. The automatic control apparatus further comprises setting means for setting the parameter adjusting device to a position corresponding to another predetermined value a predetermined time period after the parameter achieves said limit value.

The control circuit may comprise a D flip-flop having its data input supplied with a logical signal having a constant value and having an asynchronous set input connected to the output of the comparison circuit, the output of the D flip-flop constituting the output of the control circuit. An AND gate has its one input connected through a delay circuit to the output of the D flip-flop, its other being connected to the output of the direction signal generating circuit and its output connected to the clock input of the D flip-flop.

The control signal generating circuit may comprise a flip-flop the output of which is the output of the control signal generating circuit, a pulse generator, and a pulse counter having its counting input connected to the output of the pulse generator and its output connected to the toggle input of the flip-flop, the reset input of the pulse counter constituting the input of the control signal generating circuit.

The parameter adjusting device may comprise a multibit reversible counter having its data bit position inputs supplied with a predetermined combination of logical signals, an AND gate having its one input connected through a NOT gate to the bit position of the multibit reversible counter corresponding to the most significant bit position. The other inputs of the AND gate is connected to the direct output of the flip-flop and to the output of the pulse generator of the control signal generating circuit and its output connected to the the up-counting input of the multibit reversible counter. Another AND gate has its inputs connected to the output of a circuit responsive to the non-zero condition of the multibit reversible counter, to the inverted output of the flip-flop and to the output of the pulse generator of the control signal generating circuit. The output of said another AND gate is connected to the down-counting input of the multibit reversible counter, a third AND gate having its inputs connected to the bit position output of the multibit reversible counter corresponding to the most significant bit position and to the output of the control circuit. A unit is provided for setting the parameter of the controller and has a plurality of control inputs one of which is connected to the output of the third AND gate, while the others are connected to the bit position outputs of the multibit reversible counter corresponding to the less significant bit positions. In such a case the setting means may be a delay circuit connected between the output of the third AND gate and the control input of the multibit reversible counter.

The invention is further explained by a detailed description of its preferred embodiments with reference to the accompanying drawings.

BEST MODE TO CARRY OUT THE INVENTION

Figure 1:
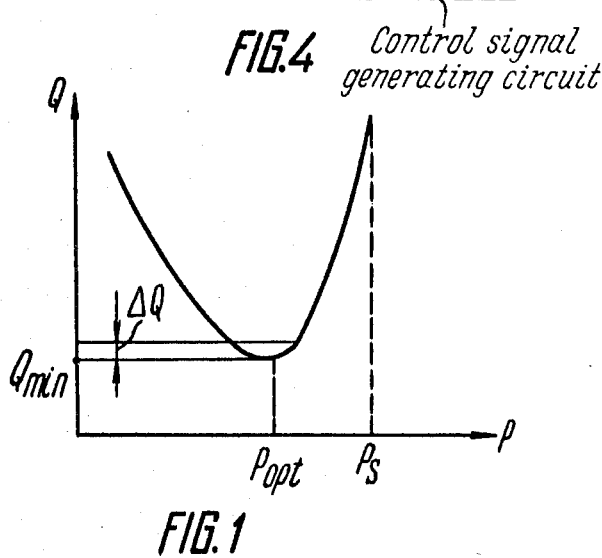
FIG. 1 is a graph showing variation of an index of control quality with respect to a parameter of the controller when a process is controlled in accordance with the present invention.

Referring to FIG. 1, an index Q of control quality, such as the variance of the deviation of an output parameter of the controlled process from the desired level, has a minimum value $Q_{min}$, corresponding to the best control quality, at a value $P_{opt}$ of a parameter "p" of an automatic controller, such as the gain of the controller. A deviation of the parameter "p" from the value $P_{opt}$ in either direction leads to increase in the index Q, i.e., to decline in the control quality. An increase or decrease in the parameter "p" leads, respectively, to decrease or increase in the stability margin of the automatic control system which becomes unstable when the parameter "p" exceeds a value $P_s$.

In the course of control, the parameter "p" of the controller is varied in a direction providing decrease in the index Q, i.e. improvement of the control quality. If the variation of the parameter "p" causes the index Q to increase, i.e. leads to decline in the control quality, the direction of variation of the parameter "p" is reversed. As a result of variation of the parameter "p" the index Q goes down to the minimum value $Q_{min}$, whereupon, during subsequent variation of the parameter "p" in the same direction, the index Q begins to increase. When the direction of variation of the index Q changes towards greater values, the direction of variation of the parameter "p" is reversed and the value of the index Q is stored. In such a case the stored value of the index of control quality will be close to its minimum value $Q_{min}$ corresponding to the best control quality.

If the value $P_{opt}$ corresponding to the minimum value $Q_{min}$ of the index of control quality remains constant, the parameter of the controller will fluctuate about its optimum value $P_{opt}$, the amplitude of the fluctuations being determined by the time lag of the controlled equipment. The variation of the controller parameter in this case corresponds to a curve I shown in FIG. 2.

Because of variation in the characteristics of the controlled process, the value $P_{opt}$ of the parameter of the controller corresponding to the minimum value $Q_{min}$ of the index of control quality and to the best control quality may change so that the index of control quality will deviate from the stored value. If this deviation is relatively small, i.e. smaller than a preselected value $\Delta Q$ (FIG. 1), the parameter of the controller is varied gradually within the range from a certain minimum value $P_1$ (FIG. 2) to a value $P_2$ which is smaller than $P_s$, i.e., within the limits corresponding to the stable state of the automatic control system. If the decrease in the index of control quality takes place when the parameter of the controller is reduced and the gradual reduction of this parameter to the value $P_1$, because of the time lag of the controlled equipment, does not produce reduction in the index of control quality to the value $Q_{min}$, the value of the parameter remains equal to $P_1$ until the index of control quality begins to rise again, whereupon the controller parameter is gradually increased until the direction of variation of the index of control quality is again reversed, and so on, until the controller parameter settles at a new optimum value $P_{opt}$. The variation of the controller parameter corresponds in this case to a curve $2a$ shown in FIG. 2. If the decrease in the index of control quality takes place when the parameter of the controller is increased and the gradual increase of this parameter to the value $P_2$ does not produce reduction in the index of control quality to the value $Q_{min}$, the value of the parameter remains equal to $P_2$ until the index of control quality begins to rise again, whereupon the controller parameter is gradually reduced until the direction of variation of the index of control quality is again reversed, and so on, until the controller parameter settles at a new optimum value $P_{opt}$. The variation of the controller parameter corresponds in this case to a curve $2b$ in FIG. 2.

Figure 2:
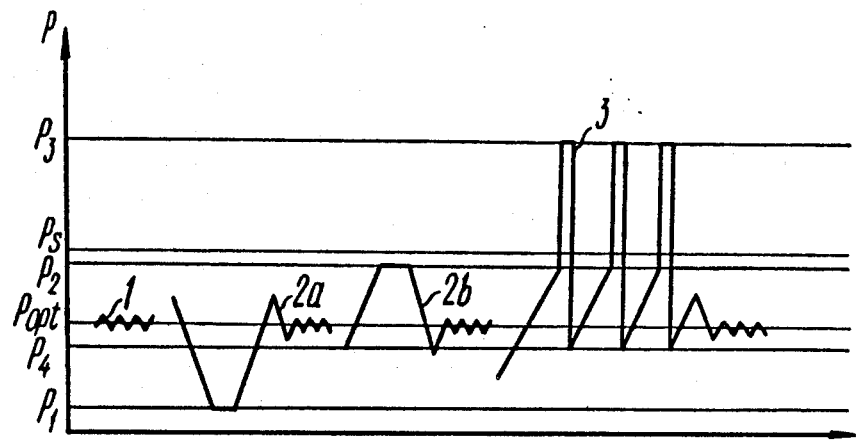
FIG. 2 shows curves illustrating variation of the controller parameter with time in accordance with the control method of the present invention.

If the deviation of the index of control quality from the stored value becomes relatively great, i.e. exceeds the value $\Delta Q$, e.g., due to a relatively rapid variation of the process characteristics, and if the decrease in the index of control quality takes place when the parameter of the controller is reduced, then the controller parameter is varied in the same way as in the case of a relatively small deviation of the index of control quality from the stored value, e.g. according to the curve $2a$ in FIG. 2. If the deviation of the index of control quality from the stored value exceeds $\Delta Q$ and the decrease in the index of control quality takes place when the controller parameter is increased, then, as soon as this parameter has reached the value $P_2$, it is abruptly increased to a value $P_3$ which is considerably greater than $P_s$ and hence corresponds to the unstable state of the automatic control system, whereupon, after a time period smaller than that during which the system may lose stability, the controller parameter is abruptly reduced to a value $P_4$ which is smaller than $P_2$.

Thereupon the controller parameter is again gradually increased and, as soon as the value $P_2$ is reached, it is increased abruptly to the value $P_3$ and then is abruptly reduced to the value $P_4$. Such a variation of the parameter is continued until the direction of variation of the index of control quality is reversed towards increasing values, whereupon the direction of variation of the controller parameter is also reversed. The variation of the controller parameter corresponds in this case to a curve 3 in FIG. 2. When, after the deviation of the index of control quality from the stored value has exceeded ΔQ, the direction of variation of the index of control quality changes towards increasing values, a new value of the index of control quality is stored, the new stored value being a new minimum value corresponding to the best control quality.

After this, the controller parameter is varied with respect to the deviation of the index of control quality from the new stored value. If this deviation is smaller than the preselected value ΔQ, the controller parameter is will be varied within the limits corrresponding to the stable state of the automatic control system, e.g. in accordance with the curve 2a or 2b in FIG. 2. If this deviation exceeds ΔQ and the decrease in the index of control quality takes place when the controller parameter is increased, then, when this parameter attains the value $P_2$, it is varied in accordance with the curve 3. After the deviation of the index of control quality from the stored value has exceeds ΔQ, a next minimum value of the index of control quality corresponding to the best control quality is stored, whereupon the variation of the controller parameter and the storage of the value of the index of control quality are carried on with regard to the deviation of the index of control quality from this stored value.

The abrupt increase in the controller parameter to a value corresponding to the unstable state of the automatic control system provides a stronger action of the controller on the controlled equipment in the event of a great deviation of the index of control quality from its optimum value in a direction which requires variation of the controller parameter in the direction of reduction in the stability margin of the automatic control system. This increases the speed at which the parameter of the controller varies in the direction corresponding to improvement in the control quality and thus provides a more rapid adjustment of the controller parameter to the optimum value under varying process characteristics when the controlled equipment has a considerable time lag. As a result, the control accuracy provided by the controller is increased.

Figure 3:
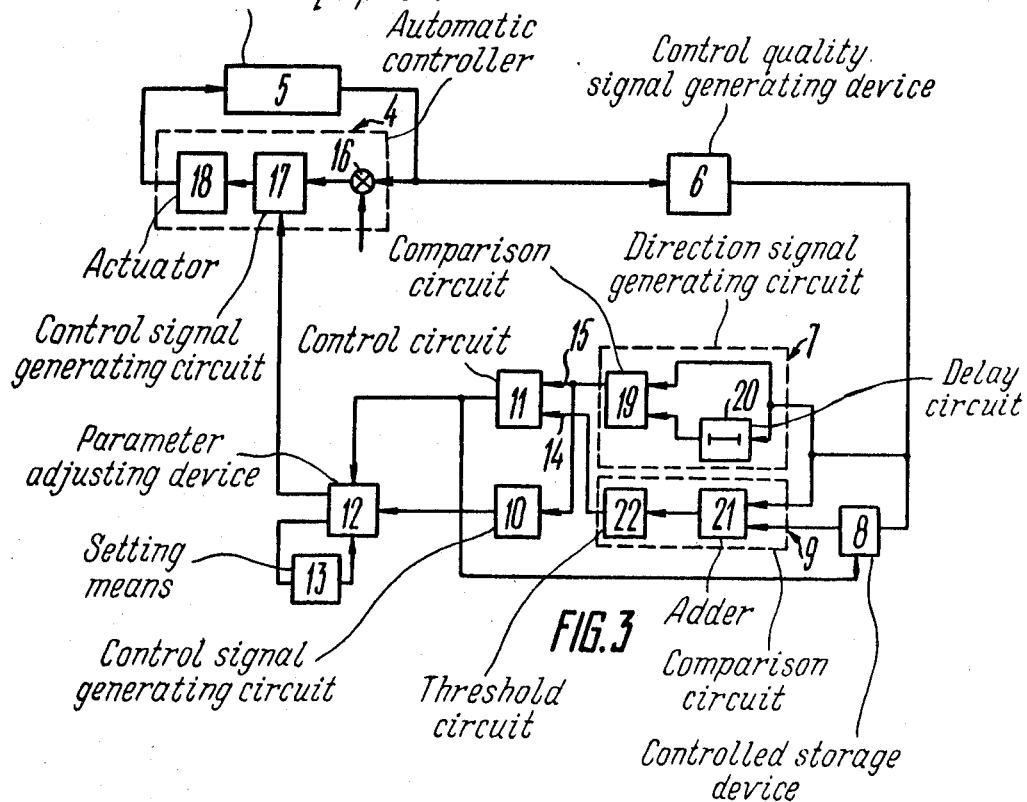
FIG. 3 is a block-diagram of an automatic control system including the automatic control apparatus of the present invention.

FIG. 3 is a block-diagram of an automatic control system which includes an automatic control apparatus operating in accordance with the method described above.

Referring to FIG. 3, the automatic control system comprises an automatic control apparatus, which apparatus includes an automatic controller 4, and a controlled equipment 5. The input of the controller 4 is supplied with an output parameter of the controlled process, which parameter is measured at the output of the controlled equipment 5 which receives a control input from the controller 4. The automatic control apparatus further comprises a control quality signal generating device 6 the input of which is supplied with the value of the output parameter of the controlled process and which generates an electric signal proportional to an index of control quality, a direction signal generating circuit 7 for generating a signal corresponding to the direction of variation of the index of control quality, a controlled storage device 8, a comparison circuit 9, a control signal generating circuit 10, a control circuit 11, a parameter adjusting device 12 for adjusting a parameter of the controller 4, and setting means 13 for setting the parameter adjusting device 12 to a predetermined position. The inputs of the direction signal generating circuit 7, the data input of the controlled storage device 8 and one input of the comparison circuit 9 are connected to the output of the control quality signal generating device 6. Another input of the comparison circuit 9 is connected to the output of the storage device 8, the output of the comparison circuit 9 being connected to one input 14 of the control circuit 11. The input of the control signal generating circuit 10 and another input 15 of the control circuit 11 are connected at the output of the direction signal generating circuit 7. The output of the control signal generating circuit 10 and the output of the control circuit 11 are connected to the inputs of the parameter adjusting device 12. The control input of the storage device 8 is connected to the output of the control circuit 11.

The automatic controller comprises a comparator 16 having its one input supplied with the output parameter of the controlled process and its other input supplied with the desired value of this parameter, a control signal generating circuit 17 having its one input connected to the output of the comparator 16 and its other input connected to the output of the parameter adjusting device 12, and an actuator 18 having its input connected to the output of the control signal generating circuit 17, the output of the actuator 18 constituting the output of the controller 4.

The controlled equipment 5 may be, for example, a chemical reactor wherein a predetermined temperature is maintained by varying the flowrates of the components supplied thereto.

The control quality signal generating device 6 generates a signal proportional to the variance of the deviation of the output parameter of the process from the desired level.

The direction signal generating circuit 7 comprises a comparison circuit 19 whose output constitutes the output of the circuit 7, and a delay circuit 20 having its output connected to one of the inputs of the comparison circuit 19. Another input of the comparison circuit 19 and the input of the delay circuit 20 are connected to each other forming the input of the circuit 7.

The controlled storage device 8 provides continuous storage of the signal applied to its data input when its control input is supplied with a binary signal having one value and cessation of further storage of the input signal when its control input is supplied with a binary signal having another value so that after cessation of storage the storage device 8 retains the value of the input signal which occurred when the change in the signal at the control input took place. The controlled storage device 8 may be a storage integrator or a register.

The comparison circuit 9 comprises an adder 21 having its inputs connected to the outputs of the control quality signal generating device 6 and of the storage device 8, and a threshold circuit 22 having its input connected in the output of the adder 21, the output of the threshold circuit 22 constituting the output of the comparison circuit 9.

The control signal generating circuit 10 is a logic circuit arranged to change its output signal upon a change in a predetermined direction of the logical signal at the output of the direction signal generating circuit 7.

The control circuit 11 is a logic circuit arranged to generate a binary signal having a predetermined value when the binary signal at the input 14 has one value and to reverse the value of the generated binary signal upon a change in the binary signal at the input 15 when the binary signal at the input 14 has another value.

The parameter adjusting device 12 is arranged to provide variation of a parameter of the controller 4 in a direction determined by the value of the binary signal applied to the parameter adjusting device 12 from the output of the control signal generating circuit 10. The range of variation of the controller parameter is determined by the value of the signal at the output of the control circuit 11. The setting means 13 is arranged to set the parameter adjusting device 12 to a position corresponding to a predetermined value of the parameter of the controller 4a, predetermined time period after the parameter attains a predetermined limit value.

Figure 4:
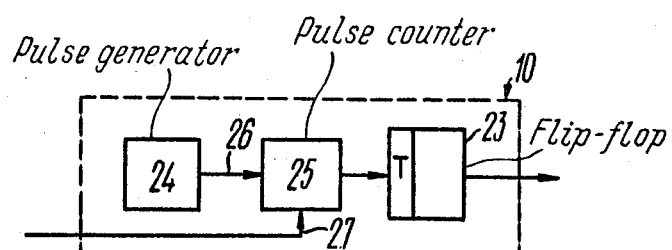
FIG. 4 is a schematic diagram of a control circuit employed in the automatic control apparatus of the present invention.

FIG. 4 is a block diagram of the control signal generating circuit 10 that may be used for purpose of this invention. Referring to FIG. 4, the control signal generating circuit 10 comprises a flip-flop 23 whose output constitutes the output of the control signal generating circuit 10, a pulse generator 24, and a pulse counter 25 having a counting input 26 and a reset input 27. The counting input 26 of the counter 25 is connected to the output of the pulse generator 23, the output of the counter 25 being connected to the toggle input T of the flip-flop 23. The reset input 27 of the counter 25 is the input of the control signal generating circuit 10.

Figure 5:
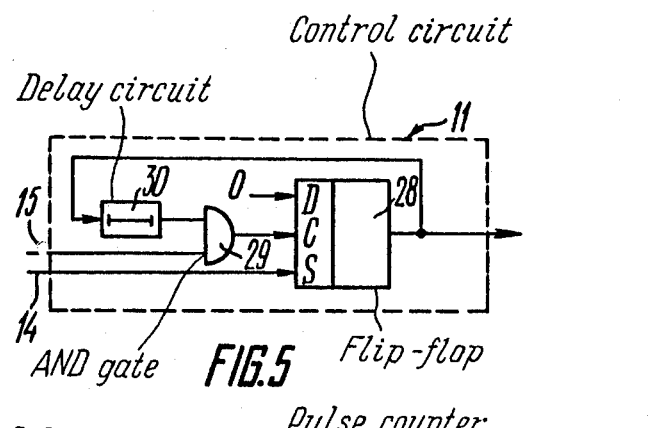
FIG. 5 is a schematic diagram of a control signal generating circuit employed in the automatic control apparatus of the present invention.

FIG. 5 is a possible schematic diagram of the control circuit 11. Referring to FIG. 5, the control circuit 11 which may be used for purpose of this invention comprises a D flip-flop 28 having its data input D supplied with a signal of logic zero, an AND gate 29 whose one input constitutes the input 15 of the control circuit 11 and whose output is connected to the clock input C of the flip-flop 28, and a delay circuit 30 connected between the output of the flip-flop 28 and another input of the AND gate 29. The flip-flop 28 is provided with an asynchronous set input S constituting the input 14 of the control circuit 11. The output of the flip-flop 28 is the output of the control circuit 11.

Figure 6:
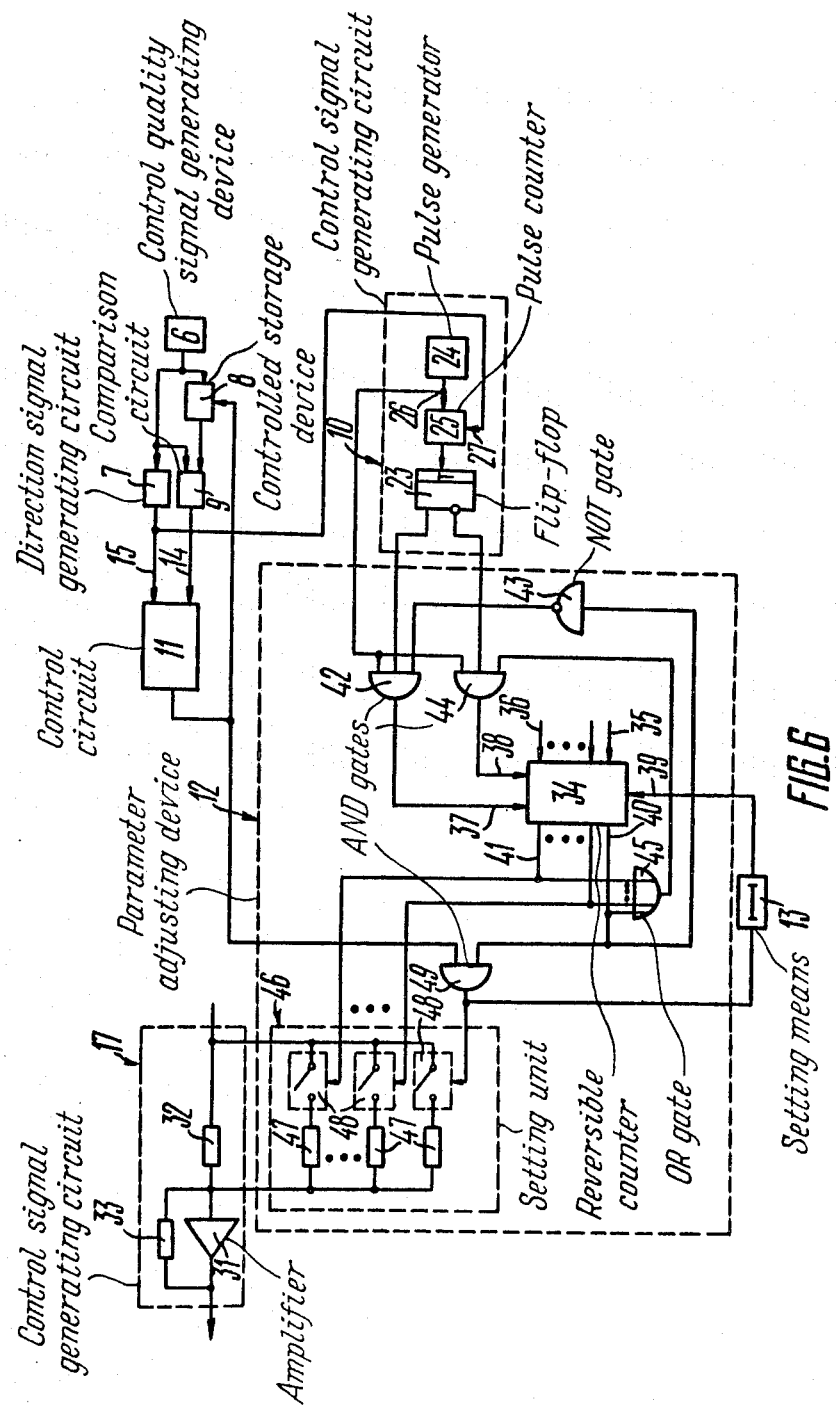
FIG. 6 is a schematic diagram of the automatic control apparatus showing in more detail the circuits of the parameter adjusting device.

FIG. 6 is a schematic diagram of the automatic control apparatus wherein variations of the controller parameter occurring upon variation of the index of control quality is carried out by application of pulses to the input of the parameter adjusting device 12. Referring to FIG. 6, the control signal generating circuit 17 of the controller 4 (FIG. 3) comprises an amplifier 31 (FIG. 6) having an input resistor 32 and a feedback circuit 33. The parameter adjusting device 12 comprises a multibit reversible counter 34 having a data input 35 corresponding to the most significant bit position, data inputs 36 corresponding to the remaining (less significant) bit positions, an up-counting input 37, a down-counting input 38, a control input 39 for controlling the storage of data into the counter 34 from its data inputs 35–36, an output 40 corresponding to the most significant bit position, and outputs 41 corresponding to the remaining (less significant) bit positions. The data inputs 35–36 of the counter 34 are supplied with a constant combination of logical signals (a code) corresponding to a certain predetermined number. The up-counting input 37 of the counter 34 is connected to the output of an AND gate 42 which has its one input connected through a NOT gate 43 to the most significant bit position output 40 of the counter 34 and its other inputs connected to the direct input of the flip-flop 23 and to the output of the pulse generator 24 of the control signal generating circuit 10. The down counting input 38 of the counter 34 is connected to the output of an AND gate 44 which has its inputs connected to the inverted output of the flip-flop 23, to the output of the pulse generator 24 and to the output of a circuit responsive to the non-zero condition of the contents of the counter 34, said non-zero condition responsive circuit being an OR gate 45 having its inputs connected to the outputs 40–41 of the counter 34.

The parameter adjusting device 12 further comprises a setting unit 46 for setting the value of the parameter of the controller 4. The setting unit 46 comprises a plurality of parallel circuits connected in parallel with the input resistor 32 of the amplifier 31 and equal in number to the number of bit positions of the counter 34, each of said parallel circuits including a resistor 47 and a controlled electronic switch 48 connected in series. The control input of the electronic switch of one circuit is connected to the output of an AND gate 49 which has its one input connected to the output of the control circuit 11 and its other input connected to the most significant bit position output 40 of the counter 34. The control inputs pf the electronic switches of the other circuits are respectively connected to the less significant bit position outputs 41 of the counter 34.

The setting means 13 is a delay circuit having its input connected to the output of the AND gate and its output connected to the control input 39 of the counter 34.

The automatic control apparatus operates as follows.

The value of the output parameter of the process is supplied from the output of the controlled equipment 5 (FIG. 3) to the input of the comparator 16 of the controller 4. The difference between the actual value of the controlled output parameter and its desired value is supplied to the control signal generating circuit 17 which, in accordance with the prescribed control mode, generates a control signal applied to the actuator 18 which acts on the controlled equipment 5 so as to reduce the deviation of the output parameter of the process from the desired value.

The value of the controlled output parameter of the process is also supplied to the control quality signal generating device 6 which generates a signal proportional to the variance of the deviation of said output parameter from the desired value, which signal is supplied to the corresponding input of the comparison circuit 19, to the input of the delay circuit 20, to the input of the storage device 8 and to one input of the adder 21. The other input of the comparison circuit 19 is supplied from the output of the delay circuit 20 with a signal corresponding to the value of the output parameter deviation variance occurring before. Hence, the value of the binary signal at the output of the comparison circuit 19 and of the direction signal generating circuit 7 will be determined by the sign of the difference between the current value of deviation variance and its preceeding value, i.e. by the direction of variation of the deviation variance.

The signal at the output of the threshold circuit 22 and of the comparison circuit 9 is determined by the magnitude of the difference between the current value of deviation variance and its value corresponding to the signal at the output of the storage device 8. The binary signal at the output of the comparison circuit 9 has one value when the magnitude of said difference is below a certain preselected value defined by the threshold voltage of the threshold circuit 22 and has another value when the magnitude of said difference exceeds said preselected value. When the binary signal at the control input of the storage device 8 has a corresponding value, the adder 21 is supplied from the output of the storage device 8 with a signal corresponding to the current value of deviation variance. When the binary signal at the control input of the storage device 8 has the opposite value, the adder 21 is supplied from the storage device 8 with a signal corresponding to the value of deviation variance which occurred just before the last change in the signal at its control input.

The binary signal corresponding to the direction of variation of the deviation variance appears at the input of the control signal generating circuit 10. With the circuit 10 made as shown in FIG. 4, the application of a signal of logic zero from the output of the direction signal generating circuit 7 (FIG. 3) to the input of the circuit 10 must correspond to increase in the deviation variance, whereas the application of a signal of logic one must correspond to decrease in the deviation variance. Then, if the deviation variance decreases, the reset input 27 of the counter 25 (FIG. 4) is supplied with a logic one with the result that the contents of the counter 25 remains unchanged, the flip-flop 23 is supplied with a logic zero and the state of the flip-flop 23, and hence the binary signal at the output of the circuit 10, remain unchanged. If the direction of variation of the deviation variance changes towards increase in the deviation variance, the reset input 27 of the counter 25 is supplied with a logic zero and the counter 25 begins to increase its count in response to the pulses applied to its counting input 26 from the generator 24. If during a given time period determined by the frequency of the generator 24 and by the capacity of the counter 25, the direction of variation of the deviation variance is not reversed again towards smaller values, the counter 25 develops at its output a pulse which passes to the toggle input T of the flip-flop 23 and causes the flip-flop 23 to reverse its state and the signal at the output of the control signal generating circuit 10. If the increase in the deviation variance continues for a shorter period of time than said given time period, the counter 25 is set to zero before the increase in its contents is sufficient to produce an output pulse, as a result of which the state of the flip-flop 23 remains unchanged.

Therefore, if the signal supplied from the output of the control signal generating circuit 10 to the parameter adjusting device 12 (FIG. 3) causes the controller parameter to vary in a direction at which the deviation variance of the output parameter of the controlled process decreases, the signal at the output of the control signal generating circuit 10 remains unchanged so that the parameter of the controller 4 continues to vary in the same direction causing further reduction in the deviation variance. If the signal supplied from the output of the circuit 10 to the parameter adjusting device 12 causes variation of the controller parameter in a direction at which the deviation variance increases, the value of the signal at the output of the circuit 10 will be reversed after a predetermined time period, which leads to variation of the controller parameter in the opposite direction causing the deviation variance to decrease. Thus the control signal generating circuit 10 shown in FIG. 4 provides application to the parameter adjusting device 12 (FIG. 3) of a signal acting on the parameter adjusting device 12 so as to maintain the deviation variance at a minimum level.

A short increase in the deviation variance, which may be caused by a casual disturbance, does not lead to reversal in the direction of variation of the controller parameter thanks to the fact that the pulse at the output of the counter 25 does not appear. If the reversal in the direction of variation of the controller parameter caused by increase in the deviation variance does not bring about reduced variation of the deviation variance during a predetermined time period, the direction of variation of the controller parameter is again reversed. This is due to the resetting of the counter 25 caused by its overflow and to the subsequent increase in the number stored in the counter 25, which number becomes sufficiently great to produce a pulse at its output. This enables stopping variation of the controller parameter in the wrong direction when such variation is due to a casual circumstance, such as prolonged disturbance.

Signals from the outputs of the direction signal generating circuit 7 (FIG. 3) and of the comparison circuit 9 are applied to the inputs 14 and 15 of the control circuit 11. The control circuit 11 is made as shown in FIG. 5 and signals, for example, of logic zero and one at the output of the direction signal generating circuit 7 (FIG. 3) respectively correspond to increase and reduction in the deviation variance. In that case, the comparison circuit 9 is such that when the deviation of the current value of the output parameter deviation variance from its value stored in the storage device 8 is smaller than the preselected value defined by the threshold voltage of the threshold circuit 22, the signal at the output of the comparison circuit 9 will be a logic zero, and when the deviation of the current value of deviation variance from the value stored in the storage device 8 exceeds the preselected value, the signal at the output of the comparison circuit 9 will be a logic one. The application of a logic one to the control input of the storage device 8 will provide in this case continuous storage of the current value of deviation variance, whereas the application of a logic zero to the control input of the storage device 8 will enable it to retain the value of deviation variance occurring just before the application of a logic zero. Then the control circuit 11 shown in FIG. 5 operates as follows.

If the difference between the current value of deviation variance of the output parameter of the process and the value stored in the storage device 8 (FIG. 3) is smaller than the preselected value and the state of the flip-flop 28 is such that the output of the control circuit 11 is logic zero, the signal stored in the storage device 8 (FIG. 3) remains unchanged. The application of a logic zero from the output of the control circuit 11 to the parameter adjusting device 12 provides variation of the controller parameter, in response to the control signal produced by the control signal generating circuit 10, within preset limits corresponding to the stable state of the automatic control system formed by the controller 4 and the controlled equipment. 5, i.e., in accordance with the curve 1, 2a or 2b in FIG. 2. The setting means 13 (FIG. 3) in this case does not operate. A change in the signal at the input 15 of the control circuit 11, i.e. in the direction of variation of the deviation variance, in this case has no effect on the state of the flip-flop 28 (FIG. 5) and on the signal at the output of the control circuit 11.

If the difference between the current value of deviation variance and its value stored in the storage device 8 (FIG. 3) exceeds the preselected value, the set input 15 of the flip-flop 28 (FIG. 5) is supplied with a logic one, whereby the state of the flip-flop 28 is reversed and the control circuit 11 develops a signal of logic one which, after a time interval determined by the delay circuit 30, appears at one of the inputs of the AND gate 29. The application of a logic one from the output of the control circuit 11 to the parameter adjusting device 12 (FIG. 3) leads to increase in the maximum value which can be attained by the parameter of the controller 4 in the course of its variation. This then leads to a change in the mode of operation of the parameter adjusting device 12 such that when the parameter attains a predetermined value it changes abruptly to a limit value corresponding to the unstable state of the control system. The return of the system to its stable state is accomplished with the help of the setting means 13 which, a predetermined time period after the parameter attains the limit value, shorter than that during which the control system may lose stability, provides setting of the device 12 to a position at which the parameter changes back to a value corresponding to the stable state of the system. In other words, the application of a signal of logic one to the parameter adjusting device 12 from the output of the control circuit 11 allows the automatic control apparatus to operate according to the curve 3 shown in FIG. 2. At the same time, the application of a logic one from the control circuit 11 (FIG. 3) to the control input of the storage device 8 causes the storage device 8 to switch to continuous storage of the current value of the deviation variance, as a result of which the comparison circuit 9 develops at its output a logic zero which is passed to the set input S of the flip-flop 28 (FIG. 5).

During variation of the deviation variance towards its minimum value in response to the control signal produced by the circuit 10 (FIG. 3) the input 15 of the control circuit 11 is supplied with a logic one. However, the state of the flip-flop 28 (FIG. 5) and the signal at the output of the control circuit 11 remain unchanged because the signal of logic zero applied to the data input D of the flip-flop 28 is stored into the flip-flop 28 at the appearance of the trailing edge of the pulse at its clock input C, i.e. at the instant of termination of the signal of logic one applied to the input 15. By the time the deviation variance attains its mininum value the AND gate 29 is already supplied with a logic one from the output of the delay circuit 30, which leads to application of a logic one to the clock input C of the flip-flop 28. As soon as the deviation variance reaches its minimum value and begins to increase, as a result of which the input 15 of the control circuit 11 is supplied with a logic zero, the state of the flip-flop 28 is reversed as a result of storage of the logic zero applied to its data input D. The control circuit 11 then develops a logic zero, whereby variation of the signal at the output of the storage device 8 (FIG. 3) is discontinued and it retains the value of deviation variance which is close to its minimum value. The appearance of a logic zero at the output of the control circuit 11 also changes the mode of operation of the parameter adjusting device 12 limiting the range of variation of the controller parameter to values corresponding to the stable state of the automatic control system. The next change in the signal at the output of the control circuit 11 will take place only if the departure of the current value of deviation variance from its minimum value stored in the storage device 8 exceeds the preselected value. Then, after the deviation variance attains its minimum value this value is stored again.

If at the instant of reversal in the state of the flip-flop 28 (FIG. 5), caused by application of a signal of logic one to its set input S, the deviation variance was changing towards greater values, the state of the flip-flop 28 after the termination of the signal of logic one at the input 14 remains. This is so because the AND gate 29 is supplied with a logic zero from the input 15. After the direction of variation of the deviation variance is reversed, e.g. as a result of strengthening of the action of the controller 4 (FIG. 3) on the controlled equipment 5, the state of the flip-flop 28 also remains unchanged until the deviation variance attains the minimum value and begins to rise again.

Thus the control circuit 11 shown in FIG. 5 enables the storage device 8 (FIG. 3) to store the minimum value of deviation variance and provides a change in the mode of operation of the parameter adjusting device 12 when the deviation variance from the stored value exceeds a preselected value, with the minimum value of deviation variance being subsequently stored again.

It may however occur that the parameter of the controller 4 (FIG. 3) exceeds its optimum value corresponding to the minimum value of deviation variance, while this minimum value, because of variation of the process characteristics, decrease so rapidly that, inspite of a further increase in the controller parameter, the deviation variance decreases and departs from the value stored in the storage device 8 by a value exceeding the preselected value. This will lead to development of a logic one at the output of the control circuit 11 and to strengthening of the action of the controller 4 on the controlled equipment 5. In such a case, inspite of application of a signal of logic one to the input 15 of the control circuit 11 due to reduction in the deviation variance, the subsequent reversal in the direction of variation of the deviation variance towards increasing values will not lead to reversal in the state of the flip-flop 28 (FIG. 5) and to storage of the value of deviation variance which does not represent its minimum value in the storage device 8 (FIG. 3).

This is achieved thanks to the presence of the delay circuit 30 (FIG. 5) which will delay the application of the logic one from the output of the flip-flop 28 to the AND gate 29 for a time period which is sufficient to let the deviation variance to change its direction of variation towards increasing values. As a result, variation of the process characteristics will not lead to application of a logic one from the AND gate 29 to the clock input C of the flip-flop 28 immediately after the appearance of a logic one at the input 14 of the control circuit 11.

With the automatic control apparatus made as shown in FIG. 6 and with the signals of logic one and zero at the output of the control circuit 11 generated as described above with reference to FIG. 5, the variation of a parameter of the controller 4 (FIG. 3), namely, of the controller gain, proceeds as follows.

If the state of the flip-flop 23 (FIG. 6) of the control signal generating circuit 10 is such that the signal at its direct output is a logic one and the signal at its inverted output is a logic zero and the state of the counter 34 corresponding to the most significant bit position contains a logic zero, then the application of a pulse from the generator 24 to the AND gate 42 leads to appearance of a pulse at the up-counting input 37 of the counter 34, as a result of which the counter 34 increases its count by one.

A change in the contents of the counter 34 leads to a change in the combination of logical signals at its outputs and to switching of the electronic switches 48 having its control inputs connected to those outputs of the counter 34 at which changes in logical signals have occurred. The resistances of the resistors 47 are chosen such that when the counter 34 decreases its count by one, the overall resistance of the input circuit of the amplifier 31, constituted by the resistor 32 and by those of the resistors 47 which are connected thereto through the closed switches is increased by a certain predetermined value. On the other hand, an increase in the number stored in the counter 34 causes the resistance of the input circuit of the amplifier 31 to decrease. The change in the resistance of the input circuit of the amplifier 31 is relatively small for each switching of the electronic switches controlled by the signals from the less significant bit position outputs of the counter 34 and relatively large for the switching of the electronic switch when under controll of the signal from the output of the AND gate 49. As a result, an increase in the contents of the counter 34 leads to increase in the gain of the controller 4 (FIG. 3), whereas a reduction in the contents of the counter 34 (FIG. 6) leads to reduction in the controller gain.

Therefore, if the state of the flip-flop 23 is such that the signal at its direct output is a logic one and the counter 34 is in a state at which the signal at its most significant bit position output 40 is a logic zero, the controller gain will gradually increase in response to the pulses produced at the output of the generator 24. Such gradual increase in the controller gain will continue until the state of the flip-flop 23 is reversed or until the increase in the contents of the counter 34 leads to appearance of a signal of logic one at the most significant bit position output 40 of the counter 34, as a result of which the AND gate 42 is supplied with a logic zero and the increase in controller gain is terminated.

If the signal at the output of the control circuit 11 is a logic zero, the appearance of a logic one at the output 40 will produce no change in the controller gain because in such a case the output of the AND gate 49 is logic zero. If the signal at the output of the control circuit 11 is a logic one, then the appearance of a logic one at the output 40 causes the AND gate 49 to develop at its output a logic one, which brings about an abrupt increase in the controller gain. After a predetermined time interval defined by the delay circuit 13 the logic one from the AND gate 49 appears at the control input 39 of the counter 34 with the result that the latter is stored with a number corresponding to the combination of logical signals at its data bit position inputs 35-36. The storage of said number into the counter 34 leads to corresponding switching of the electronic switches 48 and to an abrupt reduction in the controller gain to a predetermined value defined by the combination of the signals at the inputs 35-36. Thereupon, if the state of the flip-flop 23 remains unchanged, the contents of the counter 34 and the controller gain begin to increase again until the state of the flip-flop 23 is reversed or the counter 34 develops a logic one at its output 40.

Upon reversal in the state of the flip-flop 23 and appearance of a logic zero at its direct output and of a logic one at its inverted output the application of pulses to the up-counting input 37 of the counter 34 is stopped because the AND gate 42 is supplies from the direct output of the flip-flop 23 with a logic zero. The logic one from the inverted output of the flip-flop 23 in this case passes to the AND gate 44. If the contents of the counter 34 is not zero the AND gate 44 is supplied from the output of the OR gate 45 with a logic one. Then the application of pulses from the generator 24 to the AND gate 44 leads to appearance of pulses at the down-counting input 38 of the counter 34, which, in turn, causes the counter 34 to decrease its count, as a result of which the controller gain is gradually decreased. The decrease in the controller gain continues until the state of the flip-flop 23 is reversed or the contents of the counter 34 becomes zero. In the latter case the application of pulses to the down-counting input 38 of the counter 34 is stopped because the AND gate 44 is supplied with a logic zero from the OR gate 45. As a result, the controller gain remains at a minimum level corresponding to the open state of all the electronic switches 48 and determined by the resistance of the resistor 32.

Thus, if the logic signal at the output of the control circuit 11 has one value, the automatic control apparatus made as shown in FIG. 6 provides a gradual variation of the gain of the controller 4 (FIG. 3) within the predetermined limits and depending on the signal at the output of the control signal generating circuit 10, i.e. in accordance with the curve 1, 2a or 2b in FIG. 2. If the logical signal at the output of the control circuit 11 has another value, the automatic control apparatus shown in FIG. 6 provides, depending on the signal at the output of the control signal generating circuit 10, a gradual decrease in the controller gain to a predetermined value or a gradual and then abrupt increase in the controller gain with its subsequent abrupt reduction after a predetermined time period, i.e. in accordance with the curve 2a or 3 in FIG. 2.

To provide a more accurate adjustment it is expedient to vary the repetition rate of the pulses produced by the generator 24 (FIG. 6) so that under relatively small departures of the deviation variance from its extreme value the repetition rate of the pulses is less than under relatively great departures of the deviation variance from its extreme value. To this end the output of the control circuit 11 may be connected to the frequency control input of the generator 24.

COMMERCIAL APPLICABILITY

The present invention may be used in automatic control systems designed to maintain the output parameters of a technological process at a desired level under varying operating conditions which affect the process characteristics, e.g. in automatic control systems for controlling the moisture content and weight of a paper web in paper making machines, the pH value or some other parameter of a product obtained by mixing starting materials, the temperature in a chemical reactor or in a dryer, the thickness of roller products and so on. The present invention can most advantageously be used in automatic control systems for controlling processes wherein the starting materials or energy are supplied in portions, as it takes place, for example, in a yeast producing equipment, in rectification systems, in apparatuses for mixing construction materials, in the sediment dehydrating equipment of water treatment plants and the like.

The optimized parameter of the controller may represent the gain or time constant of the controller or some other parameter which affects the control quality so that the index of control quality is an extremal function of that parameter.

We claim:

1. A method utilizing an automatic control system for controlling a technological process by maintaining an output paramater of said process at a predetermined level with an automatic controller of the system susceptible of parameter variations in opposed directions in one of which the stability margin of the automatic control system is decreased, wherein for optimizing control quality as a function of said variations of said parameter of the controller said method comprises gradually changing the parameter of the automatic controller; determining the change and direction of change of an index of control quality with said changing parameter; reversing the direction of change of said parameter of the automatic controller if said index of control quality continues to change in the direction of decrease in control quality for a predetermined time; determining the value of the index of control quality during variation of the index of control quality from increasing to decreasing control quality; storing the value of said index of control quality thus determined at one of the instants of change in the direction of variation of said index of control quality from said increasing to decreasing control quality; storing a new value of said index of control quality at the instant of the first change in the direction of variation of said index of control quality from said increasing to decreasing control quality when the deviation of the determined value of said index of control quality from the last previously stored value exceeds a predetermined value; the improvement being characterized by increasing the speed of parameter variation of the controller in a direction corresponding to improved control quality, should said parameter be changing in a direction of decrease in the stability margin of the automatic control system while said index of control quality is changing in a direction of increase in control quality; said improvement comprising (a) abruptly changing said parameter of the automatic controller is from a predetermined value corresponding to a stable state of the control system, to a value corresponding to an unstable state of the control system during the time between the instant at which the deviation of the determined value of said parameter of the controller, from the latest stored value, exceeds said predetermined value of deviation and the instant of storing the next value of said index of control quality;

(b) abruptly changing, after a time less than that at which said automatic control system may lose stability, said controller parameter to a value corresponding to a greater stability margin of the control system than said predetermined value of the parameter; and (c) gradually changing said controller parameter in direction of decrease in the stability margin of the automatic control system until said controller parameter again attains said predetermined value or the direction of variation of said index of control quality changes from increasing to decreasing control quality.

2. A method according to claim 1, wherein said index of control quality is the mean square deviation from the average value of the deviation of said output parameter of the technological process from said predetermined level.

3. A method according to claim 1, wherein said parameter of the automatic controller comprises the gain of said controller.

4. An automatic control apparatus for automatically controlling a technological process, comprising:
an automatic controller for maintaining an output parameter of said process at a predetermined level;
a control quality signal generating device for generating a signal representative of an index of control quality;
a control signal generating circuit for generating a control signal depending on variation of said signal representative of the index of control quality;
a parameter adjusting device connected to the output of said control signal generating circuit for adjusting a parameter of said automatic controller;
a controlled storage device having a data input connected to the output of said control quality signal generating device and a control input;
a direction signal generating circuit having an input connected to the output of said control quality signal generating device for generating a signal indicative of the direction of variation of the index of control quality and an output connected to the input of said control signal generating circuit for changing the signal at said output of said control signal generating circuit immediately after the direction of variation of the index of control quality changes from increasing to decreasing control quality;
a comparison circuit having a first input connected to the output of said controlled storage device and a second input connected to the output of said control quality signal generating device; and
a control circuit having inputs respectively connected to the output of said direction signal generating circuit and to the output of said comparison circuit for generating a binary signal having a first value when the magnitude of the difference between the current value of the index of control quality and its value stored in said controlled storage device exceeds a preselected value, and having a second value after the direction of variation of the index of control quality changes from increasing to decreasing control quality if the magnitude of the difference between the current value of the index of control quality and its value stored in said controlled storage device is smaller than said preselected value, said control circuit having an output connected to said control input of said control storage device to enable said controlled storage device to store the value of the index of control quality occurring just before said binary signal assumes said second value, said parameter adjusting device being connected to the output of said control circuit to abruptly change said parameter of the automatic controller, when said parameter attains a first predetermined value and said binary signal has said first value, to a limit value beyond the range of variation of said parameter during the period that said binary signal has said second value; said automatic control apparatus further comprising
setting means for setting said parameter adjusting device to a second predetermined value a predetermined time after said parameter achieves said first value, said second predetermined value being less than said first predetermined value.

5. An automatic control apparatus according to claim 4, wherein said control circuit comprises:
a D flip-flop having a data input supplied with a logic signal having a constant value, an asynchronous set input connected to the output of said comparison circuit, a clock input and an output constituting the output of said control circuit;
a delay circuit; and
an AND gate having a first input connected by said delay circuit to said output of said D flip-flop, a second input connected to the output of said direction signal generating circuit and an output connected to said clock input of said D flip-flop.

6. An automatic control apparatus according to claim 4, wherein said control signal generating circuit comprises:
- a binary flip-flop having a toggle input and an output constituting the output of said control signal generating circuit;
- a pulse generator; and
- a pulse counter having a counting input connected to the output of said pulse generator, a reset input constituting the input to said control signal generating circuit, said pulse counter having an output connected to said toggle input of said binary flip-flop.

7. An automatic control apparatus according to claim 6, wherein said binary flip-flop is further provided with an inverted output and said parameter adjusting device comprises:
- a multibit reversible counter having data bit position inputs supplied with a predetermined combination of logic signals, an up-counting input, a down-counting input, a control input and bit position outputs;
- a non-zero condition response circuit having inputs connected to said bit position outputs of said multibit reversible counter for determining the non-zero condition of the contents of said multibit reversible counter;
- a NOT gate;
- a first AND gate having a plurality of inputs one of which is connected through said NOT gate to the bit position output of said multibit reversible counter corresponding to the most significant bit position, the other inputs of said first AND gate being connected respectively to said output of said binary flip-flop and to said output of said pulse generator, said first AND gate having an output connected to said up-counting input of said multibit reversible counter;
- a second AND gate having inputs respectively connected to the output of said non-zero condition responsive circuit, to said inverted output of said binary flip-flop and to said output of said pulse generator, and an output connected to said down-counting input of said multibit reversible counter;
- a third AND gate having inputs respectively connected to the bit position output of said multibit reversible counter corresponding to the most significant bit position and to the output of said control circuit; and
- a setting unit for setting said parameter of the controller, said setting unit having a plurality of control inputs one of which is connected to the output of said third AND gate, the other control inputs of said setting unit being respectively connected to the bit position outputs of said multibit reversible counter corresponding to the less significant bit positions, said setting means being a delay circuit connected between said output of said third AND gate and said control input of said multibit reversible counter.

* * * * *